US009068070B2

(12) United States Patent
Braun et al.

(10) Patent No.: US 9,068,070 B2
(45) Date of Patent: Jun. 30, 2015

(54) AQUEOUS BINDERS GRANULATED AND/OR FIBROUS SUBSTRATES

(75) Inventors: Markus Braun, Heidelberg (DE); Christian Krueger, Speyer (DE)

(73) Assignee: BASF SE, Ludwigshafen (DE)

( * ) Notice: Subject to any disclaimer, the term of this patent is extended or adjusted under 35 U.S.C. 154(b) by 516 days.

(21) Appl. No.: 13/119,090

(22) PCT Filed: Sep. 15, 2009

(86) PCT No.: PCT/EP2009/061903
§ 371 (c)(1),
(2), (4) Date: Mar. 15, 2011

(87) PCT Pub. No.: WO2010/034645
PCT Pub. Date: Apr. 1, 2010

(65) Prior Publication Data
US 2011/0172347 A1    Jul. 14, 2011

(30) Foreign Application Priority Data

Sep. 29, 2008 (EP) ..................................... 08165335

(51) Int. Cl.
*C08L 33/02*    (2006.01)
(52) U.S. Cl.
CPC ............. *C08L 33/02* (2013.01); *C08L 2205/02* (2013.01)
(58) Field of Classification Search
USPC ................................................ 524/522, 523
See application file for complete search history.

(56) References Cited

U.S. PATENT DOCUMENTS

| 4,076,917 | A | 2/1978 | Swift et al. |
| 5,143,582 | A | 9/1992 | Arkens et al. |
| 6,136,916 | A * | 10/2000 | Arkens et al. ................. 524/556 |
| 6,299,936 | B1 | 10/2001 | Reck et al. |
| 2007/0006390 | A1 * | 1/2007 | Clamen et al. ............... 8/115.51 |
| 2007/0292619 | A1 * | 12/2007 | Srinivasan et al. ............ 427/384 |

FOREIGN PATENT DOCUMENTS

| DE | 2 214 450 | 10/1972 |
| DE | 40 03 422 | 8/1991 |
| DE | 197 35 959 | 2/1999 |
| EP | 0 445 578 | 9/1991 |
| EP | 0 583 086 | 2/1994 |
| EP | 0 651 088 | 5/1995 |
| EP | 0 672 920 | 9/1995 |
| WO | 97 45461 | 12/1997 |
| WO | 99 09100 | 2/1999 |

OTHER PUBLICATIONS

International Search Report issued Nov. 2, 2009 in PCT/EP09/061903 filed Sep. 15, 2009.

* cited by examiner

*Primary Examiner* — Wenwen Cai
(74) *Attorney, Agent, or Firm* — Oblon, McClelland, Maier & Neustadt, L.L.P.

(57) ABSTRACT

Aqueous binders for granular and/or fibrous substrates comprising as active constituents: a) at least one polymer which is obtainable by free-radical addition polymerization and comprises in copolymerized form ≥5.5% and ≥20% by weight of an α,β-ethylenically unsaturated monocarboxylic or dicarboxylic acid [polymer A], b) at least one polymer which is obtainable by free-radical addition polymerization and comprises in copolymerized form ≥40% by weight of an α,β-ethylenically unsaturated monocarboxylic or dicarboxylic acid [polymer B], and c) at least one polyol compound having at least two hydroxyl groups [polyol C].

19 Claims, No Drawings

AQUEOUS BINDERS GRANULATED AND/OR FIBROUS SUBSTRATES

The subject matter of the present invention is an aqueous binder for granular and/or fibrous substrates comprising as active constituents a) at least one polymer which is obtainable by free-radical addition polymerization and comprises in copolymerized form ≥5.5% and ≤20% by weight of an α,β-ethylenically unsaturated monocarboxylic or dicarboxylic acid [polymer A], b) at least one polymer which is obtainable by free-radical addition polymerization and comprises in copolymerized form ≥40% by weight of an α,β-ethylenically unsaturated monocarboxylic or dicarboxylic acid [polymer B], and c) at least one polyol compound having at least two hydroxyl group [polyol C].

Subject matter of the present invention is likewise the use of the aqueous binder for producing shaped articles, a process for producing shaped articles using fibrous or granular substrates and aqueous binder, and also the shaped articles themselves.

The consolidation of fibrous or granular substrates, more particularly in sheetlike structures, exemplified by fiber webs, fiberboard or chipboard panels, etc., is frequently accomplished chemically using a polymeric binder. To increase the strength, particularly the wet strength and thermal stability, in many cases binders are used which comprise crosslinkers that give off formaldehyde. As a consequence of this, however, there is a risk of unwanted formaldehyde emission.

For the purpose of avoiding formaldehyde emissions there have already been numerous alternatives proposed to the binders known to date. For instance U.S. Pat. No. 4,076,917 discloses binders which comprise carboxylic acid-containing or carboxylic anhydride-containing polymers and β-hydroxyalkylamide crosslinkers. A disadvantage is the relatively costly and inconvenient preparation of the β-hydroxyalkylamides.

EP-A 445578 discloses boards made of finely divided materials, such as glass fibers, for example, in which mixtures of high molecular weight polycarboxylic acids and polyhydric alcohols, alkanolamines, or polyfunctional amines act as binders.

EP-A 583086 discloses formaldehyde-free aqueous binders for producing fiber webs, more particularly glass fiber webs. The binders comprise a polycarboxylic acid having at least two carboxylic acid groups and also, if appropriate, anhydride groups, and a polyol. These binders require a phosphorus reaction accelerant in order to attain sufficient strengths on the part of the glass fiber webs. It is noted that the presence of such a reaction accelerant is vital unless a highly reactive polyol is used. Highly reactive polyols specified include β-hydroxyalkylamides.

EP-A 651088 describes corresponding binders for substrates made from cellulosic fiber. These binders necessarily comprise a phosphorus reaction accelerant.

EP-A 672920 describes formaldehyde-free binding, impregnating or coating compositions which comprise at least one polyol and a polymer which is composed to an extent of 2% to 100% by weight of an ethylenically unsaturated acid or acid anhydride comonomer. The polyols are substituted triazine, triazinetrione, benzene or cyclohexyl derivatives, and the polyol radicals are always located in positions 1, 3, and 5 of the aforementioned rings. In spite of a high drying temperature, the wet tensile strengths obtained with these binders on glass fiber webs are low.

DE-A 2214450 describes a copolymer composed of 80% to 99% by weight of ethylene and 1% to 20% by weight of maleic anhydride. Together with a crosslinking agent, the copolymer is used in powder form or in dispersion in an aqueous medium for the purpose of surface coating. The crosslinking agent used is a polyalcohol which contains amino groups. In order to bring about crosslinking, however, heating must be carried out at up to 300° C.

U.S. Pat. No. 5,143,582 discloses the production of heat-resistant nonwoven-web materials using a thermosetting heat-resistant binder. The binder is formaldehyde-free and is obtained by mixing a crosslinker with a polymer containing carboxylic acid groups, carboxylic anhydride groups or carboxylic salt groups. The crosslinker is a β-hydroxyalkylamide or a polymer or copolymer thereof. The polymer crosslinkable with the β-hydroxyalkylamide is synthesized, for example, from unsaturated monocarboxylic or dicarboxylic acids, salts of unsaturated monocarboxylic or dicarboxylic acids, or unsaturated anhydrides. Self-curing polymers are obtained by copolymerizing the β-hydroxyalkylamides with monomers comprising carboxyl groups.

WO 99/09100 discloses thermally curable compositions and their use as formaldehyde-free binders for producing shaped articles, said compositions comprising, in addition to an alkanolamine having at least two OH groups, an addition polymer 1, comprising ≤5% by weight, and a further addition polymer 2, comprising ≥15% by weight of an α,β-ethylenically unsaturated monocarboxylic or dicarboxylic acid. However, the shaped articles, especially fiber webs, produced using these compositions are unable to provide full satisfaction in all their properties, particularly the tensile strength.

It was an object of the present invention to provide an alternative formaldehyde-free binder system for granular and/or fibrous substrates, resulting in improved mechanical properties, especially in fiber webs.

The aqueous binder defined at the outset has been found accordingly.

Polymer A comprises ≥5.5% and ≤20%, preferably ≥5.5% and ≤15%, and with particular preference ≥5.5% and ≤10% by weight of at least one α,β-ethylenically unsaturated monocarboxylic or dicarboxylic acid [monomers A] and, correspondingly, ≥80% and ≤94.5%, preferably ≥85% and ≤94.5%, and with particular preference ≥90% and ≤94.5% by weight of at least one further monomer [monomers B], differing from the α,β-ethylenically unsaturated monocarboxylic or dicarboxylic acids, in copolymerized form. The monomers A and the monomers B add to 100% by weight.

The monomers A are α,β-monoethylenically unsaturated, in particular $C_3$ to $C_8$, preferably $C_3$ or $C_4$, monocarboxylic or dicarboxylic acids and also their fully or partly neutralized, water-soluble salts, especially their alkali metal salts or ammonium salts, such as, for example, acrylic acid, methacrylic acid, ethylacrylic acid, itaconic acid, allylacetic acid, crotonic acid, vinylacetic acid, fumaric acid, maleic acid, 2-methylmaleic acid, and also monoesters of ethylenically unsaturated dicarboxylic acids, such as monoalkyl maleates of $C_1$ to $C_8$ alcohols, and also the ammonium, sodium or potassium salts of the aforementioned acids. However, the monomers A also comprise the anhydrides of corresponding α,β-monoethylenically unsaturated dicarboxylic acids, such as maleic anhydride or 2-methylmaleic anhydride, for example. Monomer A is preferably selected from the group comprising acrylic acid, methacrylic acid, crotonic acid, fumaric acid, maleic acid, maleic anhydride, 2-methylmaleic acid, and itaconic acid.

Suitable monomers B include all ethylenically unsaturated monomers which differ from the monomers A and are copolymerizable with them. As monomers B, mention may be made, by way of example, of vinylaromatic compounds, such as styrene, α-methylstyrene, o-chlorostyrene or vinyltoluenes, vinyl halides, such as vinyl chloride or vinylidene chloride, esters of vinyl alcohol and monocarboxylic acids containing 1 to 18° C. atoms, preferably 2 to 12 C atoms, such as vinyl acetate, vinyl propionate, vinyl n-butyrate, vinyl laurate and vinyl stearate, $C_1$ to $C_{12}$ alkyl vinyl ethers, such as methyl vinyl ether, ethyl vinyl ether, n-propyl vinyl ether, n-butyl vinyl ether, n-pentyl vinyl ether, n-hexyl vinyl ether, esters of α,β-monoethylenically unsaturated monocarboxylic and dicarboxylic acids containing preferably 3 to 6 C atoms, such as more particularly acrylic acid, methacrylic acid, maleic acid, fumaric acid, and itaconic acid, with alkanols containing generally 1 to 12, preferably 1 to 8, and more particularly 1 to 4 C atoms, such as, especially, methyl, ethyl, n-butyl, isobutyl, pentyl, hexyl, heptyl, octyl, nonyl, decyl, and 2-ethylhexyl acrylates and methacrylates, dimethyl or di-n-butyl fumarates and maleates, nitriles of α,β-monoethylenically unsaturated carboxylic acids, such as acrylonitrile, methacrylonitrile, fumaronitrile, maleonitrile, and $C_{4-8}$ conjugated dienes, such as 1,3-butadiene (butadiene) and isoprene. The aforementioned monomers form generally ≥50%, preferably ≥80%, and with particular preference ≥90% by weight of the total amount of all the monomers B and as such constitute the principal monomers B. With preference in accordance with the invention the polymer A comprises as principal monomer an ester of acrylic acid or methacrylic acid with a $C_1$ to $C_{12}$ alcohol, especially n-butyl acrylate or 2-ethylhexyl acrylate, a vinylaromatic compound, especially styrene, a nitrile of an α,β-monoethylenically unsaturated carboxylic acid, especially acrylonitrile and/or a vinyl ester of a $C_2$ to $C_{12}$ monocarboxylic acid, in copolymerized form.

Additionally contemplated as monomers B, to a minor extent, are those ethylenically unsaturated monomers which comprise either at least one sulfonic acid group and/or its corresponding anion and/or at least one amino, amido, ureido or N-heterocyclic group and/or the ammonium derivatives thereof that are alkylated or protonated on the nitrogen. Examples include acrylamide and methacrylamide, and also vinylsulfonic acid, 2-acrylamido-2-methylpropanesulfonic acid, styrenesulfonic acid, and their water-soluble salts, and also N-vinylpyrrolidone, 2-vinylpyridine, 4-vinylpyridine, 2-vinylimidazole, 2-(N,N-dimethylamino)ethyl acrylate, 2-(N,N-dimethylamino)ethyl methacrylate, 2-(N,N-diethylamino)ethyl acrylate, 2-(N,N-diethylamino)ethyl methacrylate, 2-(N-tert-butylamino)ethyl methacrylate, N-(3-N',N'-dimethylaminopropyl)methacrylamide, and 2-(1-imidazolin-2-onyl)ethyl methacrylate. The aforementioned monomers B are used in general in amounts ≤10%, preferably ≤8%, and in particular ≤5% by weight, based in each case on the total amount of monomers B. As a preferred monomer, use is made of acrylamide and/or methacrylamide in an amount of ≥0.5% and ≤4% by weight, based on the total amount of monomers B.

Monomers which typically enhance the internal strength of the films formed from a polymer matrix normally contain at least one epoxy group, at least one carbonyl group or at least two nonconjugated ethylenically unsaturated double bonds. Examples of such monomers are monomers containing two vinyl radicals, monomers containing two vinylidene radicals, and monomers containing two alkenyl radicals. Particularly advantageous in this context are the diesters of dihydric alcohols with α,β-monoethylenically unsaturated monocarboxylic acids, among which acrylic acid and methacrylic acid are preferred. Examples of such monomers containing two nonconjugated ethylenically unsaturated double bonds are alkylene glycol diacrylates and dimethacrylates, such as ethylene glycol diacrylate, 1,2-propylene glycol diacrylate, 1,3-propylene glycol diacrylate, 1,3-butylene glycol diacrylate, 1,4-butylene glycol diacrylate, and ethylene glycol dimethacrylate, 1,2-propylene glycol dimethacrylate, 1,3-propylene glycol dimethacrylate, 1,3-butylene glycol dimethacrylate, and 1,4-butylene glycol dimethacrylate, and also divinylbenzene, vinyl methacrylate, vinyl acrylate, allyl methacrylate, allyl acrylate, diallyl maleate, diallyl fumarate, methylenebisacrylamide, cyclopentadienyl acrylate, triallyl cyanurate or triallyl isocyanurate. The aforementioned monomers B are used generally in amounts ≤10%, preferably ≤5%, and more particularly ≤2% by weight, based in each case on the total amount of monomers B. As a preferred monomer, use is made of allyl methacrylate, methylenebisacrylamide, divinylbenzene and/or 1,4-butylene glycol diacrylate, in an amount of ≥0.1 and ≤2% by weight, based on the total amount of monomers B.

Polymer B comprises ≥40%, preferably ≥80%, and with particular preference 100% by weight of at least one monomer A and, accordingly, ≤60%, preferably ≤20%, and with particular preference no monomers B in copolymerized form. The monomers A and the monomers B in this case add to 100% by weight.

As preferred monomers A the polymer B comprises at least one compound selected from acrylic acid, methacrylic acid, crotonic acid, fumaric acid, maleic acid, maleic anhydride, 2-methylmaleic acid and itaconic acid.

The preparation of the polymers A and of the polymers B is familiar to the skilled worker and is accomplished, for example, by free-radical addition polymerization of the monomers A and monomers B by the method of bulk, emulsion, solution, precipitation or suspension polymerization (in this regard see also the preparation of the corresponding polymers in WO 99/09100, page 5, line 12 to page 13, line 7). Preferably the polymers A are prepared by free-radically initiated aqueous emulsion polymerization and the polymers B by solution polymerization.

The implementation of free-radically initiated emulsion polymerizations of ethylenically unsaturated monomers in an aqueous medium has been described many times before now and is therefore well known to the skilled worker (in this regard cf. Emulsion polymerization in Encyclopedia of Polymer Science and Engineering, vol. 8, pages 659 ff. (1987); D. C. Blackley, in High Polymer Latices, vol. 1, pages 35 ff. (1966); H. Warson, The Applications of Synthetic Resin Emulsions, chapter 5, pages 246 ff. (1972); D. Diederich, Chemie in unserer Zeit 24, pages 135 to 142 (1990); Emulsion Polymerisation, Interscience Publishers, New York (1965); DE-A 40 03 422, and Dispersionen synthetischer Hochpolymerer, F. Hölscher, Springer-Verlag, Berlin (1969)]. The free-radically initiated aqueous emulsion polymerization reactions are typically accomplished by dispersing the ethylenically unsaturated monomers in the form of monomer droplets in the aqueous medium, with the use of dispersing assistants, and subjecting them to polymerization by means of a free-radical polymerization initiator.

Frequently the polymer A has a glass transition temperature, $T_g$, in the range ≥0 and ≤130° C., advantageously ≥20 and ≤100° C., and with particular advantage ≥30 and ≤80° C. The glass transition temperature, $T_g$, is the limiting value of the glass transition temperature to which said temperature tends with increasing molecular weight, according to G. Kanig (Kolloid-Zeitschrift & Zeitschrift für Polymere, vol. 190, p. 1, equation 1). Within the context of this document, glass transition temperature $T_g$ is understood to mean the glass transition temperature which has been determined by the DSC method (differential scanning calorimetry, 20 K/min, midpoint measurement, DIN 53765).

By virtue of the equation known as the Fox equation it is possible for the skilled worker to identify polymers A in the appropriate $T_g$ range and to prepare them specifically by appropriate variation of the nature and amount of the monomers A and B.

According to Fox (T. G. Fox, Bull. Am. Phys. Soc. 1956 [Ser. II] 1, page 123, and in accordance with Ullmann's Encyclopädie der technischen Chemie, vol. 19, page 18, 4th edition, Verlag Chemie, Weinheim, 1980) the glass transition temperature of copolymers with no more than low degrees of crosslinking is given in good approximation by:

$$1/T_g = x^1/T_g^1 + x^2/T_g^2 + \ldots x^n/T_g^n,$$

where $x^1, x^2, \ldots x^n$ are the mass fractions of the monomers 1, 2, ... n and $T_g^1, T_g^2, \ldots T_g^n$ are the glass transition temperatures of the polymers synthesized in each case only from one of the monomers 1, 2, ... n, in degrees Kelvin. The $T_g$ values for the homopolymers of the majority of monomers are known and are listed, for example, in Ullmann's Encyclopedia of Industrial Chemistry, 5th edition, vol. A21, page 169, VCH Weinheim, 1992; further sources of homopolymer glass transition temperatures include, for example, J. Brandrup, E. H. Immergut, Polymer Handbook, 1st ed., J. Wiley, New York 1966, 2nd ed. J. Wiley, New York 1975, and 3rd ed. J. Wiley, New York 1989.

The inventively used aqueous polymer dispersions typically have polymer solids contents, in terms of polymer A, of ≥10% and ≤70% by weight, frequently ≥20 and ≤65%, and often ≥40 and ≤60%, by weight, based in each case on the aqueous polymer dispersion. The number-average particle diameter of the emulsion polymers A (cumulant z-average), as determined via quasielastic light scattering (ISO standard 13321), is situated in general between 10 and 2000 nm, advantageously between 20 and 1000 nm, and with particular advantage between 50 and 700 nm or 80 to 400 nm.

Free-radically initiated solution polymerization is also familiar in principle to the skilled worker and is accomplished in particular in water or in an organic solvent (see, for example, A. Echte, Handbuch der Technischen Polymerchemie, chapter 6, VCH, Weinheim, 1993 or B. Vollmert, Grundriss der Makromolekularen Chemie, volume 1, E. Vollmert Verlag, Karlsruhe, 1988; L. Kotzeva, J. Polym. Sci. A-27, 1989 (4), pages 1325ff; C. Erbil et al., Polymer 41, 2000, pages 1391ff.; C. Yang, X. Lu Yun, J. Polym. Sci. 75(2), 2000, pages 327ff.; M. Sen et al., Polymer 40(9), 1999, pages 913ff.; F. Wang et al., Anal. Chem. 68, 1996, pages 2477ff.; J. Velada et al., Macromol. Chem. and Phys. 196, 1995, pages 3171.ff; J. M. Cowie, C. Haq, Br. Polym. J. 9, 1977, pages 241ff.; J. Velada et al., Polymer Degradation and Stability 52, 1996, pages 273ff,; A. Horta et al., Makromol. Chem., Rapid Commun. 8, 1987, pages 523ff.; T. Hirano et al., J. Polym. Sci. A-38, 2000, pages 2487ff.; B. E. Tate, Adv. Polymer Sci. 5, 1967, pages 214ff.). Where polymer B is prepared in an organic solvent, at least some of the organic solvent, advantageously ≥50% or ≥90% by weight, and, with more particular advantage, all of the organic solvent, is generally removed after the polymerization has been completed, and the polymer B is taken up in water, advantageously in deionized water. The corresponding methods are familiar to the skilled worker. Thus, for example, the switching of the solvent for water can be accomplished by distilling off at least some of the solvent, advantageously all of it, in one or more stages, at, for example, atmospheric pressure (1 atm absolute) or subatmospheric pressure (<1 atm absolute), and replacing it by water. Frequently it may be advantageous to remove the solvent from the solution by introducing steam and at the same time to replace it by water. This is more particularly the case when the organic solvent has a certain steam volatility.

Advantageously polymer B has a weight-average molecular weight ≥1000 g/mol and ≤1 000 000 g/mol. It is favorable if the weight-average molecular weight of polymer B is ≤500 000 g/mol and with particular advantage ≤200 000 g/mol. With particular advantage polymer B has a weight-average molecular weight ≥3000 g/mol, preferably ≥5000 g/mol, and in particular ≥10 000 g/mol. The setting of the weight-average molecular weight during the preparation of polymer B is familiar to the skilled worker and is accomplished advantageously by means of free-radically initiated aqueous solution polymerization in the presence of compounds which transfer free-radical chains, referred to as free-radical chain regulators. The determination of the weight-average molecular weight as well is familiar to the skilled worker and is accomplished, for example, by means of gel permeation chromatography.

The aqueous binder, in accordance with the invention, comprises not only the polymer A and the polymer B but also, as an active constituent, a polyol compound C having at least 2 hydroxyl groups (polyol C). It is advantageous in this context to use those polyols C which are not volatile or only slightly volatile at the temperatures of drying and/or curing and which therefore have a correspondingly low vapor pressure.

This polyol C may in principle be a compound having a molecular weight ≤1000 g/mol or a polymeric compound having a molecular weight >1000 g/mol. Examples of polymeric compounds having at least 2 hydroxyl groups include polyvinyl alcohol, partly hydrolyzed polyvinyl acetate, homopolymers or copolymers of hydroxyalkyl acrylates or hydroxyalkyl methacrylates, such as hydroxyethyl acrylate or methacrylate or hydroxypropyl acrylate or methacrylate, for example. Examples of further inventively useful polymeric polyols C are given in WO 97/45461, page 3, line 3 to page 14, line 33, among other publications.

Compounds contemplated as polyol C with a molecular weight ≤1000 g/mol include all those organic compounds which have at least 2 hydroxyl groups and a molecular weight ≤1000 g/mol. Mention may be made exemplarily of ethylene glycol, 1,2-propylene glycol, glycerol, 1,2- and 1,4-butanediol, pentaerythritol, trimethylolpropane, sorbitol, sucrose, glucose, 1,2-, 1,3-, and 1,4-dihydroxybenzene, 1,2,3-trihydroxybenzene, 1,2-, 1,3-, and 1,4-dihydroxycyclohexane, and also preferably alkanolamines, such as, for example, compounds of the general formula I,

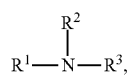

formula (I)

in which $R^1$ is an H atom, a $C_1$ to $C_{10}$ alkyl group or a $C_2$ to $C_{10}$ hydroxyalkyl group, and $R^2$ and $R^3$ are a $C_2$ to $C_{10}$ hydroxyalkyl group.

With particular preference $R^2$ and $R^3$ independently of one another are a $C_2$ to $C_5$ hydroxyalkyl group, and $R^1$ is an H atom, a $C_1$ to $C_5$ alkyl group or a $C_2$ to $C_5$ hydroxyalkyl group.

Compounds of the formula (I) include more particularly diethanolamine, triethanolamine, diisopropanolamine, triisopropanolamine, methyldiethanolamine, butyldiethanolamine and/or methyldiisopropanolamine.

Examples of further inventively useful polyols C having a molecular weight 1000 g/mol are likewise found in WO 97/45461, page 3, line 3 to page 14, line 33. Examples of further polyols C having a molecular weights ≤1000 g/mol and also >1000 g/mol are also found in WO 99/09100, page 13, line 29 to page 24, line 32. As a result of their express referencing, the stated polyols C are also to be regarded as an integral part of this text.

The polyol C is preferably selected from the group comprising diethanolamine, triethanolamine, diisopropanolamine, triisopropanolamine, methyldiethanolamine, butyldiethanolamine and/or methyldiisopropanolamine, with triethanolamine being more particularly preferred.

For the inventively useful aqueous binders, the polymer A, the polymer B, and the polyol C are used preferably in a quantitative ratio to one another such that the weight ratio of polymer A to polymer B (based on solids) is 100:1 to 1:100, advantageously 10:1 to 1:10, and with particular advantage 7:3 to 3:7, and the weight ratio of polymer B to polyol C (based on solids) is 100:1 to 1:1, advantageously 50:1 to 1.5:1, and with particular advantage 10:1 to 2:1.

With more particular advantage the amounts of polymer A, polymer B, and polyol C are chosen such that the ratio of the number of equivalents of carboxyl groups of the polymers A and B (in total) to the number of equivalents of hydroxyl groups of the polyol C is in the range 20:1 to 1:1, preferably 15:1 to 1.5:1, and more particularly 12:1 to 2:1 (the anhydride groups in this case being counted as 2 carboxyl groups).

The preparation of the inventively useful aqueous binders is familiar to the skilled worker and is accomplished, for example, by arbitrary mixing of the individual components in an aqueous medium. In one further embodiment the aqueous binder can also be prepared by preparing the polymer A in an aqueous medium in the presence of polymer B, and admixing the polyol C to the aqueous medium of this polymer mixture.

The aforementioned aqueous binders comprise preferably ≤5% by weight, frequently ≤1.0%, often ≤0.5%, and also frequently ≥0.1% and often ≥0.3%, by weight, based on the sum of the total amounts of polymer A, polymer B, and polyol C (solid/solid), of a phosphorus reaction accelerant. Phosphorus reaction accelerants are disclosed in, for example, EP-A 583086 and EP-A 651088. They include, more particularly, alkali metal hypophosphites, phosphites, polyphosphates, and dihydrogen phosphates, polyphosphoric acid, hypophosphoric acid, phosphoric acid, alkylphosphinic acid, or oligomers and/or polymers of these salts and acids.

The aqueous binders of the invention, however, preferably comprise no phosphorus reaction accelerants or no amounts of a phosphorus compound that are active in accelerating the reaction. The binders of the invention may, however, comprise esterification catalysts familiar to the skilled worker, such as, for example, sulfuric acid or p-toluenesulfonic acid, or titanates or zirconates.

Furthermore, the aqueous binders of the invention may also comprise further, optional auxiliaries familiar to the skilled worker, such as, for example, what are known as thickeners, defoamers, neutralizing agents, buffer substances, preservatives, finely divided inert fillers, such as aluminum silicates, quartz, precipitated or fumed silica, light or heavy spar, talc or dolomite, coloring pigments, such as titanium white, zinc white or black iron oxide, adhesion promoters and/or flame retardants.

Where the aqueous binders of the invention are to be used as binders for mineral fibers and/or glass fibers or webs produced from them, advantageously ≥0.001% and ≤5% by weight, and with more particular advantage ≥0.05% and ≤2% by weight, based on the sum of the total amounts of polymer A, polymer B and polyol C, of at least one silicon-containing organic compound (adhesion crosslinker) is added to the aqueous binders, such as, for example, an alkoxysilane, such as methyltrimethoxysilane, n-propyltrimethoxysilane, n-octyltrimethoxysilane, n-decyltrimethoxysilane, n-hexadecyltrimethoxysilane, dimethyldimethoxysilane, trimethylmethoxysilane, 3-acetoxypropyltrimethoxysilane, 3-aminopropyltrimethoxysilane, 3-aminopropyltriethoxysilane, 3-chloropropyltrimethoxysilane, 3-glycidyloxypropyltrimethoxysilane, 3-mercaptopropyltrimethoxysilane and/or phenyltrimethoxysilane, with particular preference being given to functionalized alkoxysilanes, such as 3-acetoxypropyltrimethoxysilane, 3-aminopropyltrimethoxysilane, 3-aminopropyltriethoxysilane, 3-chloropropyltrimethoxysilane, 3-glycidyloxypropyltrimethoxysilane and/or 3-mercaptopropyltrimethoxysilane.

The aqueous binders of the invention typically have solids contents (formed from the sum of the total amount of polymer A, polymer B and polyol C reckoned as solids) of ≥1% and ≤70%, frequently ≥5% and ≤65%, and often ≥10% and ≤55%, by weight, based in each case on the aqueous binder.

The aqueous binders according to the invention typically have pH values (measured at 23° C.; diluted with deionized water to a solids content of 10% by weight) in the range of ≥1 and ≤10, advantageously ≥2 and ≤6, and with more particular advantage ≥3 and ≤5. The pH in this case may be set using all of the basic compounds that are familiar to the skilled worker. It is common, however, to use those basic compounds which are not volatile at the temperatures during drying and/or curing, such as sodium hydroxide, potassium hydroxide or sodium carbonate, for example.

The abovementioned aqueous binders are advantageously suitable for use as binders for granular and/or fibrous substrates. With advantage, therefore, the aqueous binders stated can be used for producing shaped articles from granular and/or fibrous substrates.

Granular and/or fibrous substrates are familiar to the skilled worker. Examples include wood chips, wood fibers, cellulose fibers, textile fibers, plastics fibers, glass fibers, mineral fibers or natural fibers such as jute, flax, hemp or sisal, but also cork chips, sand and also other organic or inorganic, natural and/or synthetic, granular and/or fibrous compounds whose longest extent, in the case of granular substrates, is ≤10 mm, preferably ≤5 mm, and more particularly ≤2 mm. It will be appreciated that the term "substrate" is also intended to comprise the fiber webs obtainable from fibers, such as, for example, those known as mechanically consolidated (needled for example) fiber webs or fiber webs chemically bound for example with melamine/formaldehyde resins or polyvinyl alcohol. With more particular advantage the aqueous binder of the invention is suitable as a formaldehyde-free binder system for the aforementioned fibers and for fiber webs formed from them.

The process for producing a shaped article from a granular and/or fibrous substrate and the aforementioned aqueous binder is advantageously performed by applying the aqueous binder of the invention to the granular and/or fibrous substrates and/or drenching the granular and/or fibrous substrates with the aqueous binder of the invention, if appropriate shaping the granular and/or fibrous substrates treated with the aqueous binder, and then subjecting the treated granular and/or fibrous substrates to a thermal treatment step at a temperature ≥110° C.

The treatment (impregnation) of the granular and/or fibrous substrates with the aqueous binder of the invention is generally accomplished by applying the aforementioned aqueous binder uniformly to the surface of the granular and/or fibrous substrates. The amount of aqueous binder in this case is chosen such that ≥0.1 g and ≤100 g, preferably ≥1 g and ≤50 g, and with more particular preference ≥5 g and ≤30 g of binder, formed from the sum of the total amount of polymer A, polymer B and polyol C (reckoned as solids), are used per 100 g of granular and/or fibrous substrate. The impregnation of the granular and/or fibrous substrates is familiar to the skilled worker and takes place, for example, by drenching or by spraying of the granular and/or fibrous substrates.

Following impregnation, the granular and/or fibrous substrate is brought if appropriate into the desired form, by means, for example, of introduction into a heatable press or mold. Subsequently the shaped impregnated granular and/or fibrous substrate is dried and cured in a manner familiar to the skilled worker.

Frequently the drying and/or curing of the impregnated granular and/or fibrous substrate, which if appropriate has been shaped, takes place in two temperature stages, the drying stage taking place at a temperature <110° C., preferably ≥20° C. and ≤100° C., and with more particular preference ≥40 and ≤100° C., and the curing stage taking place at a temperature of ≥110° C., preferably ≥130 and ≤250° C. or ≥160° C. and ≤220° C., and with more particular preference ≥170° C. and ≤210° C.

The drying stage in this case takes place advantageously such that drying at a temperature <110° C. is carried out until the shaped, impregnated granular and/or fibrous substrate, which frequently still does not have its ultimate shape (and is referred to as a semifinished product), has a residual moisture content ≤30%, preferably ≤15%, and with more particular preference ≤10% by weight. This residual moisture content is generally determined by first weighing approx. 1 g of the resulting semifinished product at room temperature, then drying it at 110° C. for 2 minutes, and subsequently cooling it and reweighing it at room temperature. In this case the residual moisture content corresponds to the difference in weight of the semifinished product before and after the drying operation at 110° C., relative to the weight of the semifinished product before the drying operation, multiplied by a factor of 100.

The semifinished product obtained in this way is still deformable after heating to a temperature of about 100° C., and at that temperature can be brought into the ultimate shape of the desired shaped article.

The subsequent curing stage takes place advantageously such that the semifinished product is heated at a temperature ≥110° C. until it has a residual moisture content ≤2%, preferably ≤1% or ≤0.5%, and with more particular preference ≤0.1%, by weight, the binder curing as a consequence of a chemical esterification reaction.

Frequently the shaped articles are produced by bringing the semifinished product into its ultimate shape in a shaping press, in the aforementioned temperature ranges, and subsequently curing it.

It will be appreciated, however, that it is also possible for the drying stage and the curing stage of the shaped articles to take place in one workstep, in a shaping press, for example.

The shaped articles obtainable by the process of the invention, especially fiber webs, have advantageous properties, more particularly improved tensile strength as compared with the prior-art shaped articles.

The invention is elucidated with reference to the following nonlimiting examples.

EXAMPLES

A. Preparation of the Polymers A

Polymer A1 (PA1)

A polymerization vessel equipped with metering facilities and temperature regulation was charged at 20 to 25° C. (room temperature) under a nitrogen atmosphere with 200.0 g of deionized water and 10.9 g of an aqueous polystyrene seed (solids content 33% by weight, number-average particle diameter 32 nm)

and this initial charge was heated to 90° C. with stirring. When this temperature was reached, 11.1 g of a 7% strength by weight aqueous solution of sodium peroxide disulfate in deionized water were added. Thereafter, at 90° C., beginning synchronously, feeds 1 and 2 were metered continuously at constant volume flow rates over the course of 3 hours.

Feed 1 (Homogeneous Mixture of):

528.4 g of deionized water 80.0 g of a 15% strength by weight aqueous solution of sodium lauryl sulfate 263.4 g of n-butyl acrylate (nBA)

213.0 g of styrene (ST)

62.7 g of acrylonitrile (AN)

37.2 g of a 50% strength by weight aqueous solution of acrylamide (AA)

6.3 g of allyl methacrylate (AMA) and 36.0 g of methacrylic acid (MS)

Feed 2 (Homogeneous Solution of):

35.1 g of deionized water and 2.6 g of sodium peroxodisulfate

After the end of feeds 2 and 3, the polymerization mixture was left to react at 90° C. for a further hour. After that, beginning synchronously and over separate feed lines, 12 g of a 10% strength by weight aqueous solution of tert-butyl hydroperoxide, and a solution of 1.3 g of sodium disulfite, 0.7 g of acetone and 14.3 g of deionized water, were metered continuously into the polymerization mixture at constant volume flow rate over the course of two hours. Finally the polymerization mixture was admixed with a solution consisting of 28.1 g of a 32% strength by weight aqueous solution of a $C_{12}/C_{14}$ alkyl polyglycol ether sulfate sodium salt (Emulphor® FAS 30; commercial product of BASF SE), in dilution with 15 g of deionized water, the addition taking place by metering over the course of 10 minutes, and then the polymerization mixture was cooled to room temperature.

The aqueous polymer dispersion obtained had a solids content of 39.7% by weight and a glass transition temperature of 48° C. The average particle diameter was 142 nm.

The solids content was determined in general by drying a defined amount of the aqueous polymer dispersion (about 1 g) to constant weight (about 2 hours) in a drying oven, in an aluminum crucible having an internal diameter of approximately 5 cm, at 120° C. Two separate measurements were conducted in each case. The figures reported in the examples represent the average of each of the two results.

The average particle diameter of the polymer particles was determined generally by dynamic light scattering of an aqueous polymer dispersion, diluted to 0.005% to 0.01% by weight with deionized water, at 23° C., using an Autosizer IIC from Malvern Instruments, England. The figure reported is the average diameter of the cumulative evaluation (cumulant $Z_{average}$) of the measured autocorrelation function (ISO standard 13321).

The glass transition temperature was determined generally by the DSC method (Differential Scanning calorimetry, 20 K/min, midpoint measurement, DIN 53765).

Polymer A2 (PA2)

PA2 was prepared as for PA1, with the difference that in feed 1 18.0 g of MS and 18.0 g of acrylic acid (AS) were used instead of 36.0 g of MS.

The aqueous polymer dispersion obtained had a solids content of 39.0% by weight and a glass transition temperature of 48° C. The average particle diameter was 163 nm.

Polymer A3 (PA3)

PA3 was prepared as for PA1, with the difference that feed 1, with the amount of emulsifier and also the proportions of the monomers nBA, ST, AN, AA and AMA to one another being kept constant, was composed of 528.4 g of deionized water, 257.4 g of nBA, 208.8 g of ST, 61.2 g of AN, 37.2 g of AA, 6.0 g of AMA, and 48.0 g of MS.

The aqueous polymer dispersion obtained had a solids content of 39.1% by weight and a glass transition temperature of 46° C. The average particle diameter was 123 nm.

Polymer A4 (PA4)

PA4 was prepared as for PA3, with the difference that in feed 1 24.0 g of MS and 24.0 g of AS were used instead of 48.0 g of MS.

The aqueous polymer dispersion obtained had a solids content of 39.7% by weight and a glass transition temperature of 46° C. The average particle diameter was 157 nm.

Polymer A5 (PA5)

PA5 was prepared as for PA1, with the difference that feed 1, with the amount of emulsifier and also the proportions of the monomers nBA, ST, AN, AA and AMA to one another being kept constant, was composed of 529.0 g of deionized water, 252.0 g of nBA, 204.0 g of ST, 60.0 g of AN, 36.0 g of AA, 6.0 g of AMA, and 60.0 g of MS.

The aqueous polymer dispersion obtained had a solids content of 39.8% by weight and a glass transition temperature of 57° C. The average particle diameter was 100 nm.

Polymer A6 (PA6)

PA6 was prepared as for PA1, with the difference that feed 1, with the amount of emulsifier and also the proportions of the monomers nBA, ST, AN, AA and AMA to one another being kept constant, was composed of 530.2 g of deionized water, 238.2 g of nBA, 192.6 g of ST, 56.7 g of AN, 33.6 g of AA, 5.7 g of AMA, and 90.0 g of MS.

The aqueous polymer dispersion obtained had a solids content of 39.8% by weight and a glass transition temperature of 70° C. The average particle diameter was 142 nm.

Polymer A7 (PA7)

PA7 was prepared as for PA1, with the difference that feed 1, with the amount of emulsifier and also the proportions of the monomers nBA, ST, AN, AA and AMA to one another being kept constant, was composed of 530.8 g of deionized water, 229.8 g of nBA, 186.0 g of ST, 54.6 g of AN, 32.4 g of AA, 5.4 g of AMA, and 108.0 g of MS.

The aqueous polymer dispersion obtained had a solids content of 39.9% by weight and a glass transition temperature of 77° C. The average particle diameter was 135 nm.

Comparative Polymer 1 (CA1)

CA1 was prepared as for PA1, with the difference that feed 1, with the amount of emulsifier and also the proportions of the monomers nBA, ST, AN, AA and AMA to one another being kept constant, was composed of 527.8 g of deionized water, 268.8 g of nBA, 217.8 g of ST, 63.9 g of AN, 38.4 g of AA, 6.3 g of AMA, and 24.0 g of MS.

The aqueous polymer dispersion obtained had a solids content of 38.9% by weight and a glass transition temperature of 44° C. The average particle diameter was 156 nm.

Comparative Polymer 2 (CA2)

CA2 was prepared as for PA1, with the difference that feed 1, with the amount of emulsifier and also the proportions of the monomers nBA, ST, AN, AA and AMA to one another being kept constant, was composed of 527.5 g of deionized water, 274.5 g of nBA, 222.0 g of ST, 65.4 g of AN, 39.0 g of AA, 6.6 g of AMA, and 12.0 g of MS.

The aqueous polymer dispersion obtained had a solids content of 39.2% by weight and a glass transition temperature of 40° C. The average particle diameter was 117 nm.

Comparative Polymer 3 (CA3)

CA3 was prepared as for PA1, with the difference that feed 1, with the amount of emulsifier and also the proportions of the monomers nBA, ST, AN, AA and AMA to one another being kept constant, was composed of 527.2 g of deionized water, 280.2 g of nBA, 226.8 g of ST, 66.6 g of AN, 39.6 g of AA, and 6.6 g of AMA.

The aqueous polymer dispersion obtained had a solids content of 39.9% by weight and a glass transition temperature of 34° C. The average particle diameter was 123 nm.

The resulting polymer dispersions PA1 to PA7 and CA1 to CA3 were diluted with deionized water to a solids content of 38.5% by weight.

B. Preparation of Polymer B

A 2 l four-necked flask equipped with an anchor stirrer, reflux condenser, and metering facilities was charged at room temperature with 212 g of deionized water, 10 mg of iron(II) sulfate heptahydrate, and 201 g of maleic anhydride under a nitrogen atmosphere. Subsequently the initial-charge solution was heated to 100° C. with stirring. After it had reached that temperature, the initiator feed, consisting of a homogeneous solution of 2.0 g of sodium persulfate and 256 g of deionized water, was started and was metered into the initial charge with a constant volume flow rate over the course of 5 hours. 5 minutes after the start of the initiator feed, the monomer feed, consisting of a homogeneous solution of 215 g of deionized water and 734 g of AS, was started and was metered into the aqueous polymerization mixture with a constant volume flow rate over the course of 4 hours. After the end of the initiator feed, the polymerization mixture was allowed to continue reaction at polymerization temperature for 1 hour, after which the clear polymer solution obtained was cooled to room temperature.

The resulting polymer B solution had a solids content of 46.3% by weight. The Fikentscher K value of the polymer B (ISO 1628-1) was determined and found to be 23.

The resulting polymer solution was diluted with deionized water to a solids content of 45% by weight.

C. Preparation of the Aqueous Binders

Added with stirring at room temperature to 77.9 parts by weight of each of the polymer dispersions PA1 to PA7 and CA1 to CA3, diluted to 38.5% by weight, were first 34.5 parts by weight of the polymer B solution, diluted to 45% by weight, and then 4.6 parts by weight of triethanolamine, and also 216.6 parts by weight of deionized water, after which the aqueous binders obtained were stirred for 15 minutes in each case.

D. Performance Investigations

Needled polyethylene terephthalate (PET) spunbonded webs from Freudenberg-Politex, with a basis weight of 150 g/m$^2$, were used.

For the purpose of impregnation, the spunbonded PET webs were passed in the longitudinal direction via a continuous PES sieve belt with a belt running speed of 60 cm per minute through the aforementioned 15% strength by weight aqueous binder liquors. Through subsequent suction removal of the aqueous binder, the wet add-on was set at 195 g/m² (corresponding to 29.3 g/m² of binder, reckoned as solid). The impregnated PET spunbonded webs thus obtained were dried/cured in a Mathis oven, on a plastic mesh support, at 200° C. for 3 minutes, with the maximum hot-air flow. After the webs had cooled to room temperature, test strips measuring 240×50 mm were cut in the longitudinal direction of the fiber. The test strips obtained were then stored in a controlled-climate chamber at 23° C. and 50% relative humidity for 24 hours. The PET spunbonded web test strips obtained are referred to below, as a function of the polymer A used for the corresponding aqueous binder, as test strips PA1 to PA7 and CA1 to CA3.

Determination of the Tensile Strength at 23° C.

The tensile strength was determined in accordance with DIN 52123, using a Zwick-Roell tensile testing machine. The test strips PA1 to PA6 and CA1 to CA3 were introduced vertically into a clamping device such that the free clamped-in length was 200 mm. Subsequently the clamped-in test strips were pulled apart in opposing directions at a speed of 25 mm per minute until the test strips tore. The higher the force needed to tear the test strips, the better the evaluation of the corresponding tensile strength. Five measurements were carried out in each case. The figures reported in table 1 represent in each case the average of these measurements.

TABLE 1

Composition of the tensile strength results

| Test strips | Tensile strength [in N/50 mm] |
|---|---|
| PA1 | 384 |
| PA2 | 399 |
| PA3 | 411 |
| PA4 | 389 |
| PA5 | 386 |
| PA6 | 394 |
| PA7 | 376 |
| CA1 | 358 |
| CA2 | 360 |
| CA3 | 367 |

From the results it is clearly apparent that the test strips obtained using the aqueous binders of the invention exhibit improved tensile strength behavior as compared with the aqueous binders used in accordance with the prior art.

The invention claimed is:

1. An aqueous binder, comprising:
   (a) a polymer which is obtained by free-radical addition polymerization and comprises in a copolymerized form ≥5.5% and ≤20% by weight of at least one of an α,β-ethylenically unsaturated monocarboxylic and an α,β-ethylenically unsaturated dicarboxylic acid,
   (b) a polymer which is obtained by free-radical addition polymerization and comprises 100% by weight of at least one of an α,β-ethylenically unsaturated monocarboxylic and an α,β-ethylenically unsaturated dicarboxylic acid, and
   (c) a polyol compound having at least two hydroxyl groups,
   wherein
   the aqueous binder does not comprise a phosphorus-containing accelerator, and
   the polymer (a) has a glass transition temperature in the range between ≥0 and ≤130° C.

2. The aqueous binder according to claim 1, wherein the polymer (a) comprises, in reacted form, at least one compound selected from the group consisting of acrylic acid, methacrylic acid, crotonic acid, fumaric acid, maleic acid, maleic anhydride, 2-methylmaleic acid, and itaconic acid.

3. The aqueous binder according to claim 1, wherein the polymer (a) comprises, in reacted form, at least one compound selected from the group consisting of an ester of acrylic acid, an ester of methacrylic acid with a $C_1$ to $C_{12}$ alcohol, a vinylaromatic compound, a nitrile of an α,β-monoethylenically unsaturated carboxylic acid, and a vinyl ester of a $C_2$ to $C_{12}$ monocarboxylic acid, as a main component.

4. The aqueous binder according to claim 1, wherein the polymer (b) comprises, in reacted form, at least one compound selected from the group consisting of acrylic acid, methacrylic acid, crotonic acid, fumaric acid, maleic acid, maleic anhydride, 2-methylmaleic acid, and itaconic acid.

5. The aqueous binder according to claim 1, wherein the polyol compound (c) is an alkanolamine.

6. The aqueous binder according to claim 1, wherein the polyol compound (c) is a triethanolamine.

7. The aqueous binder according to claim 1, wherein
   the weight ratio of the polymer (a) to the polymer (b) based on solids is from 100:1 to 1:100 and
   the weight ratio of the polymer (b) to the polyol compound (c), based on solids is from 100:1 to 1:1.

8. The aqueous binder according to claim 1, wherein the equivalence ratio of the carboxyl groups of the polymer (a) and the polymer (b) to the hydroxyl groups of the polyol compound (c) is from 20:1 to 1:1.

9. The aqueous binder according to claim 1, wherein
   the weight ratio of the polymer (a) to the polymer (b) based on solids is from 10:1 to 1:10 and
   the weight ratio of the polymer (b) to the polyol compound (c), based on solids is from 50:1 to 1.5:1.

10. The aqueous binder according to claim 1, wherein
    the weight ratio of the polymer (a) to the polymer (b) based on solids is from 7:3 to 3:7 and
    the weight ratio of the polymer (b) to the polyol compound (c), based on solids is from 10:1 to 2:1.

11. The aqueous binder according to claim 1, wherein the equivalence ratio of the carboxyl groups of the polymer (a) and the polymer (b) to the hydroxyl groups of the polyol compound (c) is from 15:1 to 1.5:1.

12. The aqueous binder according to claim 1, wherein the polymer (a) is obtained by free-radical addition polymerization and comprises in a copolymerized form ≥5.5% and ≤15% by weight of at least one of an α,β-ethylenically unsaturated monocarboxylic and an α,β-ethylenically unsaturated dicarboxylic acid.

13. The aqueous binder according to claim 1, wherein the polymer (a) has a glass transition temperature in the range between ≥20 and ≤100° C.

14. The aqueous binder according to claim 1, wherein the polymer (a) is obtained by free-radical addition polymerization and comprises in a copolymerized form ≥6% and ≤18% by weight of at least one of an α,β-ethylenically unsaturated monocarboxylic and an α,β-ethylenically unsaturated dicarboxylic acid.

15. A shaped article, comprising:
    the aqueous binder according to claim 1; and
    at least one selected from the group consisting of a granular substrate and a fibrous substrate.

16. A process for producing a shaped article, comprising:
    applying the aqueous binder according to claim 1 to at least one selected from the group consisting of a granular substrate and a fibrous substrate, optionally shaping at least one of the granular substrate and the fibrous substrate treated with the aqueous binder, and then thermally treating at least one of the shaped granular substrate and the shaped fibrous substrate at a temperature $\geq 110°$ C. to obtain a shaped article.

17. The process according to claim 16, wherein the aqueous binder is present in an amount of $\geq 1$ g and $\leq 100$ g calculated as a sum of a total amount of the polymer (a), the polymer (b), and the polyol compound (c) based on solids per 100 g of the granular substrate and/or the fibrous substrate.

18. The process according to claim 16, wherein the granular substrate and/or the fibrous substrate is a mechanically consolidated or chemically bound web.

19. A shaped article obtained by the process according to claim 16.

* * * * *